– – – – – – – – – – – – – – – – – – – – – – – – – – – – – – – –

United States Patent [19]

Shimizu et al.

[11] 4,257,076

[45] Mar. 17, 1981

[54] GROOVED DRUM FOR TAPE RECORDING AND/OR REPRODUCING APPARATUS

[75] Inventors: Yukihiko Shimizu, Tagajo; Kazunori Ozawa, Tomiya, both of Japan

[73] Assignee: Sony Corporation, Tokyo, Japan

[21] Appl. No.: 29,753

[22] Filed: Apr. 12, 1979

[30] Foreign Application Priority Data

Apr. 17, 1978 [JP] Japan .................. 53-44938

[51] Int. Cl.³ .............. G11B 5/52; G11B 15/60; G11B 21/04
[52] U.S. Cl. ................. 360/130.24; 226/97; 226/193; 360/84; 360/107
[58] Field of Search ........... 360/130.24, 130.2–130.23, 360/129, 128, 83–84, 107; 226/93, 97, 193, 196

[56] References Cited

U.S. PATENT DOCUMENTS

| | | | |
|---|---|---|---|
| 3,056,164 | 10/1962 | Reichel et al. | 226/193 |
| 3,286,895 | 11/1966 | Poumakis | 226/97 |
| 3,398,870 | 8/1968 | Mullan et al. | 226/97 |
| 3,405,855 | 10/1968 | Daly et al. | 226/97 |
| 3,534,893 | 10/1970 | Maxon | 360/130.24 |
| 3,643,791 | 2/1972 | Thornsbery | 226/193 |

Primary Examiner—Alfred H. Eddleman
Attorney, Agent, or Firm—Lewis H. Eslinger; Alvin Sinderbrand

[57] ABSTRACT

A recording and/or reproducing apparatus, such as a video tape recorder, comprises a drum having a peripheral surface on which a magnetic tape can be wrapped, and at least one head for recording signals on, reproducing signals from, the magnetic tape by helically scanning it. Grooves are formed in the peripheral surface of the drum to inhibit formation of a thin layer of water between the surface of the drum and the magnetic tape. The lengths of the grooves are substantially parallel to the direction of transport of the magnetic tape and each groove includes a wall portion disposed at an angle greater than 3 degrees to a line joining the crests of the grooves and normal to the direction of transport of the magnetic tape.

12 Claims, 5 Drawing Figures

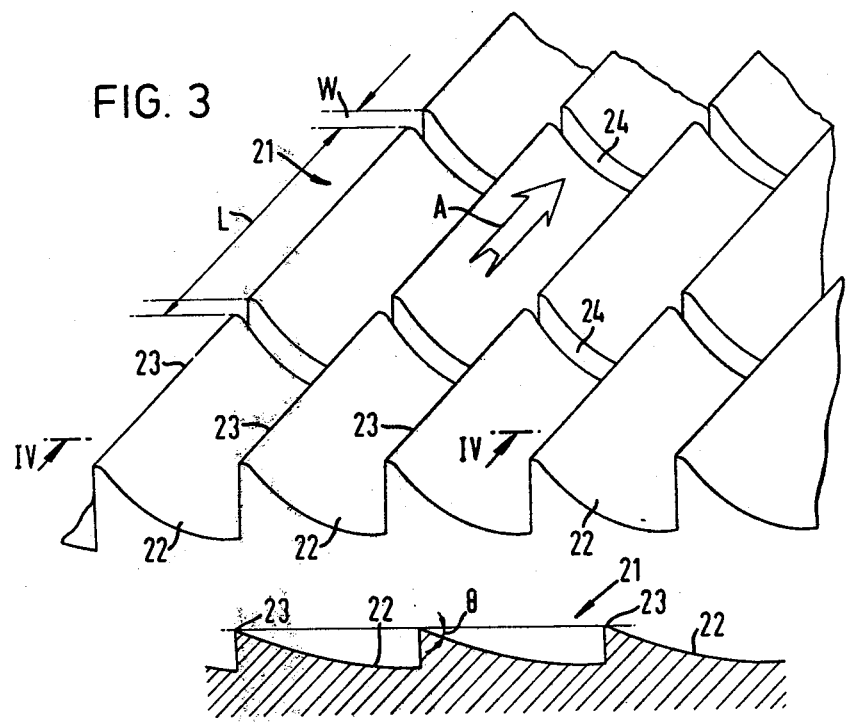
FIG. 3
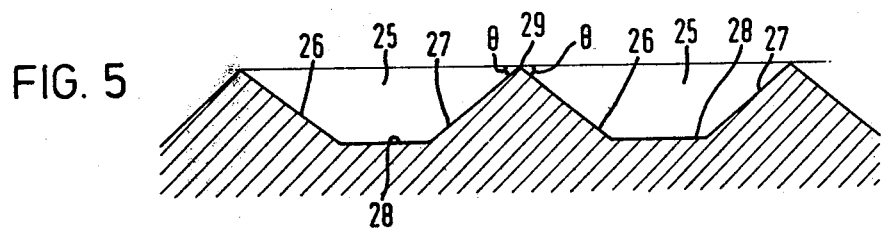
FIG. 4
FIG. 5

GROOVED DRUM FOR TAPE RECORDING AND/OR REPRODUCING APPARATUS

BACKGROUND OF THE INVENTION

1. Field of the Invention

The present invention relates to recording and/or reproducing apparatus wherein a tape is wrapped on a peripheral surface of a drum and contacts at least one head for recording signals on, or reproducing signals from, the tape by scanning it.

2. Description of the Prior Art

In a helical scanning type video tape recorder (VTR) it is necessary that the magnetic tape runs stably and smoothly at all times. However, in practice there is a tendency for frictional forces between the magnetic tape and the peripheral surface to increase when the magnetic tape has been running for some time and under certain conditions. This can result in stick/slip transport of the magnetic tape with consequent pulsating motion of the magnetic tape, or even complete sticking of the magnetic tape. Any such interference with free transport of the magnetic tape has a very adverse effect on recording and reproducing, and may easily result in damage to the magnetic tape.

There have been some prior proposals for overcoming this problem, and some of these proposals have included the provision of grooves on the peripheral surface of the drum, but these proposals seem to have been based on an imperfect understanding of the reasons why the frictional forces between the magnetic tape and the peripheral surface of the drum tend to increase, and these proposals have not resulted in any satisfactory solution to the problem.

SUMMARY OF THE INVENTION

The present inventors have ascertained that, at least under some conditions, the frictional forces between the magnetic tape and the peripheral surface of the drum are increased by the formation of a thin layer of water therebetween.

It is therefore one object of the present invention to reduce the frictional forces resulting from such a thin layer of water between a magnetic tape and the peripheral surface of the drum in a recording and/or reproducing apparatus.

Another object of the present invention is to provide a recording and/or reproducing apparatus having means to break up any thin layer of water forming between a magnetic tape and the peripheral surface of the drum of the apparatus.

Another object of the present invention is to provide a recording and/or reproducing apparatus having a drum the surface of which is grooved with a particular configuration for the purpose of breaking up any thin layer of water forming between a magnetic tape and the peripheral surface of the drum of the apparatus.

According to the present invention there is provided a recording and/or reproducing apparatus comprising a drum having a peripheral surface on which a tape can be wrapped, at least one head for recording signals on the tape and/or reproducing signals from the tape by helically scanning it and grooves formed in the peripheral surface of the drum, the lengths of the grooves being substantially parallel to the direction of transport of the tape and each groove including a wall portion disposed at an angle greater than 3 degrees to a line joining the crests of the grooves and normal to the direction of transport of the tape.

Further grooves may be formed in the peripheral surface of the drum, the lengths of these further grooves being substantially normal to the lengths of the first-mentioned grooves, the width of these further grooves being from 1 micron to 300 microns, the depth of these further grooves being more than 1 micron, and the pitch of these further grooves being from 0.01 mm to 0.7 mm.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 is an enlarged perspective view of part of the peripheral surface of a stationary guide drum of the VTR;

FIG. 4 is a cross-sectional view taken along the line IV—IV in FIG. 3; and

FIG. 5 is a cross-sectional view of part of an alternative form of the peripheral surface of the stationary guide drum of the VTR.

DESCRIPTION OF THE PREFERRED EMBODIMENTS

Figure 1:
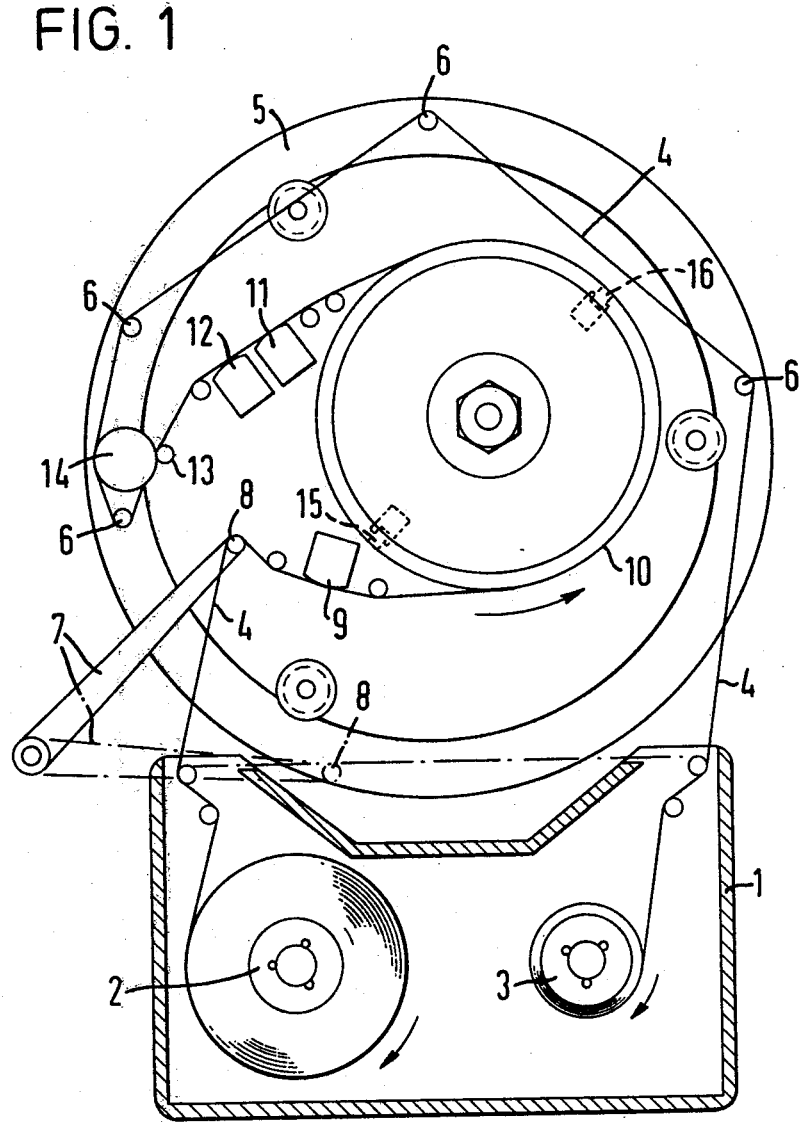
FIG. 1 is a diagrammatic plan view of part of a cassette-type VTR to which the embodiments of the invention are applied.

A cassette-type VTR to which embodiments of the present invention can be applied will first be briefly described with reference to FIG. 1. A tape cassette 1 contains tape reels 2 and 3 to which the ends of a magnetic tape 4 are attached and on which the magnetic tape 4 is wound. The magnetic tape 4 can be withdrawn from the tape cassette 1 and is extended in a tape transport path as shown in FIG. 1 by four tape-drawing pins 6 which are mounted on a rotatable loading ring 5 of the VTR, and a tape-guide pin 8 which is mounted at the end of a tape-drawing arm 7. The loop so formed in the magnetic tape 4 passes a whole-width erasing head 9, is wrapped around a rotary head drum 10, and passes an audio erasing head 11 and a combination head 12.

The magnetic tape 4 can be pressed against a capstan 13, which rotates at a predetermined constant speed, by a pinch roller 14, whereupon the magnetic tape 4 is transported at a predetermined constant speed, contacting the heads 9, 11 and 12, and also a pair of rotary heads 15 and 16 mounted on the rotary head drum 10 which is rotated at a high speed, when an operating button (not shown) is operated to put the VTR into the recording mode or the reproducing mode. Thus the magnetic tape 4 passes from the reel 2, around the rotary head drum 10 where signals are recorded on the magnetic tape 4 or signals recorded on the magnetic tape 4 are reproduced, and is wound-up on the reel 3.

Figure 2:
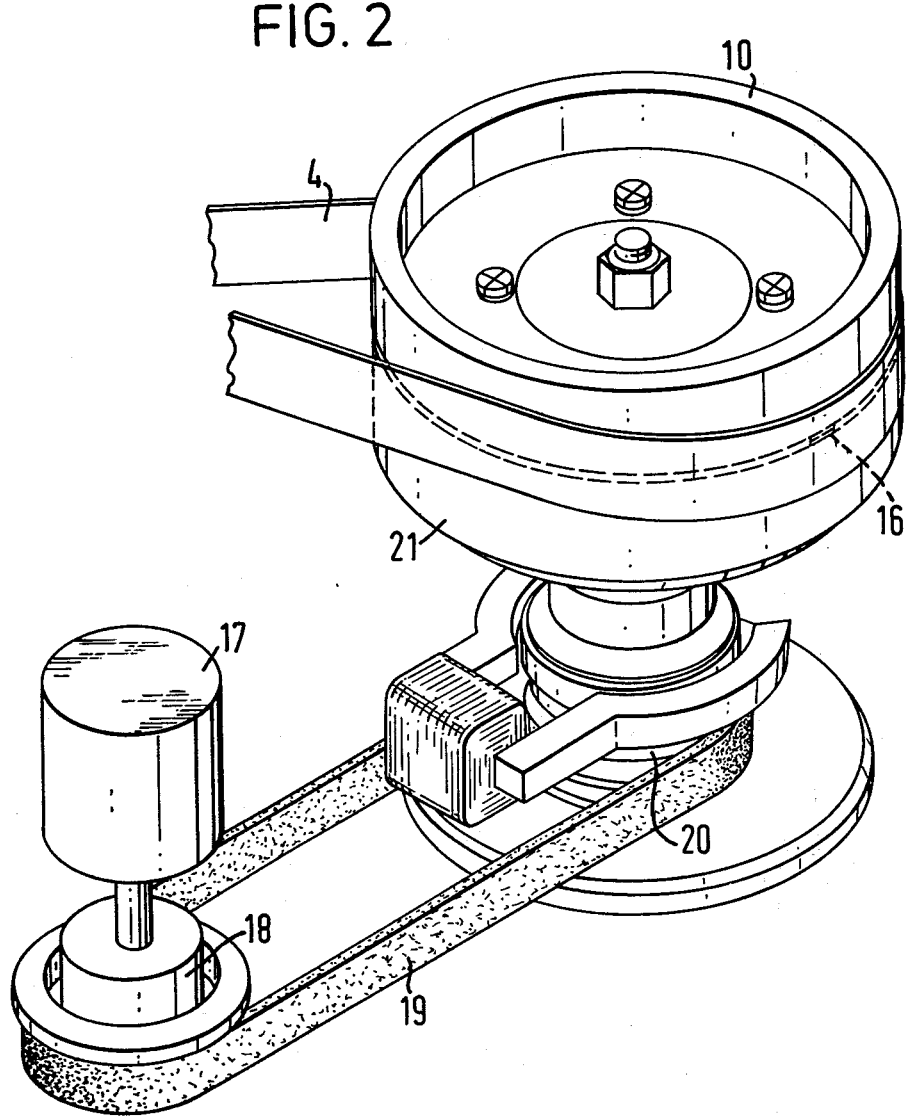
FIG. 2 is a perspective view of a head drum assembly of the VTR.

As shown in FIG. 2, the rotary head drum 10 is cylindrical, and is driven by an electric motor 17 through a pulley 18, a drive belt 19 and a pulley 20. A stationary, cylindrical guide drum 21 is arranged under and coaxial with the rotary head drum 10, and is supported by a supporting means (not shown). The magnetic tape 4 is wrapped on the peripheral surfaces of the drums 10 and 21, the magnetic tape 4 being inclined relative to the drums 10 and 21, whereby the rotary heads 15 and 16 scan the magnetic tape 4 helically.

Next, there will be described the surface structure of the stationary guide drum 21, reference being made to FIGS. 3 and 4. Many grooves 22 are formed on the peripheral surface, that is, the tape-contacting surface, of the guide drum 21 and the lengths of the grooves 22 are substantially parallel to the transport direction (shown by arrow A in FIG. 3) in which the magnetic tape 4 runs. The cross-sectional shape of the grooves 22 along a line perpendicular to the tape transport direction, that is a line substantially normal to the width of the magnetic tape 4, is similar to the profile of the teeth of a saw, as shown in FIG. 4, that is, the grooves 22 are formed of a more gently sloping wall portion and a wall portion disposed substantially radially relative to the drum. The angle formed between the more gently sloping wall portion of the groove 22 near the crest 23 of the groove 22 and a line which connects the crests 23 of the grooves 22 to each other in the width direction of the magnetic tape 4, denoted by $\theta$ in FIG. 4, should be more than 3 degrees, and is for example 10 degrees in this embodiment.

Because of the grooves 22, the growth of a thin layer of water between the magnetic tape 4 and the stationary guide drum 21 is substantially inhibited, as any such layer which tends to form is rapidly broken up into tiny droplets. Thereof, frictional resistance between the magnetic tape 4 and the stationary guide drum 21 caused by the surface tension of a thin layer of the water does not develop, and smooth, stable transport of the magnetic tape 4 is possible. Such a layer of water is apt to appear between the magnetic tape 4 and the stationary guide drum 21 when the angle $\theta$ is small, namely smaller than 3 degrees, even if the groove 22 has sufficient depth. In such a case the grooves 22 do not have much effect. That is, it has been confirmed by experiments that the shape of the crests 23 between the grooves 22 has a substantial influence on the growth of any thin layer of water. It has been found that the value of the angle $\theta$ within 0.2 microns from the crest 23 in the tangential direction with respect to the centre of the stationary guide drum 21, should be greater than 3 degrees.

Additionally, longitudinal grooves 24 may be formed on the peripheral surface of the stationary guide drum 21, the grooves 24 being at right angles to the direction in which the magnetic tape 4 runs (that is, the direction shown by arrow A). Preferably the pitch L between the grooves 24 is as small as possible to break the thin layer of the water into tiny droplets. However, from the point of view of practical machining, the pitch L is preferably from 0.01 mm to 0.7 mm. It is not preferable for the pitch L to be larger than 0.7 mm, because in such a case the cohesive resistance due to the thin layer of water does not decrease. Moreover, the effect of breaking up the thin layer of water into droplets disappears when the width W of the groove 24 is too small. Preferably the width W should be more than 1 micron. On the other hand, when the width W of the groove 24 is too large, the surface of the magnetic tape 4 may be injured because the magnetic tape 4 eats into the grooves 24 and magnetic powder is eroded from the magnetic tape 4. Therefore it is preferable for the width W of the groove 24 to be smaller than 300 microns to avoid damage to the magnetic tape 4. Moreover, the depth of the longitudinal groove 24 is preferably more than 1 micron, as otherwise the effect of breaking up the water layer tends to decrease after an hour or so of use. Most preferably, the pitch L is 150 microns, the width W is 30 microns and the depth is 15 microns. It is also preferable for the walls of the grooves 24 to extend substantially radially relative to the drum 21.

Thus as described above, the grooves 22 and 24 are formed on the peripheral surface of the stationary guide drum 21, parallel with and at right angles, respectively, to the direction in which the magnetic tape 4 runs, and hence generation of a cohesive force by a thin layer of the water is restrained, and the magnetic tape 4 is effectively prevented from adherence to the stationary drum 21 or from stick-slip running.

Next, there will be described the second embodiment of the invention with reference to FIG. 5. In the above mentioned first embodiment, the sectional shape of the grooves 22 is similar to the teeth of a saw, and the groove 22 has a gentle slope and a vertical slope, as shown in FIG. 4, but in this embodiment, the groove 25 includes a pair of gentle slopes 26 and 27 and a flat portion 28. Moreover, the angles $\theta$ formed between the gentle slopes 26 and 27 and a line which connects the crests 29 of the grooves 25 with each other are more than 3 degrees, as in the first embodiment. By this arrangement, an effect similar to that of the first embodiment is accomplished.

In the embodiments of the invention described herein the grooves 22 and 24 have been shown to be provided in the peripheral surface of the stationary guide drum 21, but similar grooves can also be used to reduce friction on the peripheral surface of the rotary head drum 10 or on the peripheral surfaces of both drums 10 and 21.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A helical scan video tape recording and/or reproducing apparatus comprising a guide drum having a peripheral surface for guiding a longitudinally transported video tape wrapped helically thereon, at least one rotary head projecting from said surface for recording signals on said tape and/or reproducing signals from said tape by obliquely scanning said tape on the guide drum, and first grooves formed in said peripheral surface for preventing interference with smooth transport of said video tape due to buildup of moisture between said drum and said video tape, the lengths of said first grooves being substantially parallel to the direction of transport of said tape and each said first groove including a wall portion disposed at an acute angle greater than 3 degrees to a line joining the crests of said grooves and normal to said direction of transport of said tape.

2. A helical scan video tape recording and/or reproducing apparatus according to claim 1 wherein, viewed in cross-section normal to said direction of transport of said tape, said first grooves have a sawtooth configuration with each said first groove being formed by a first wall portion disposed at said acute angle greater than 3 degrees to said line joining the crests of said first grooves and a second wall portion disposed substantially radially relative to said drum.

3. A helical scan video tape recording and/or reproducing apparatus according to claim 2 wherein said acute angle of said first wall portion is greater than 3 degrees at a distance not greater than 0.2 microns from the adjacent said crest.

4. A helical scan video tape recording and/or reproducing apparatus according to claim 3 wherein said acute angle is approximately 10 degrees.

5. A helical scan video tape recording and/or reproducing apparatus according to claim 1 wherein, viewed in cross-section normal to said direction of transport of said tape, each said groove is formed by a first wall portion disposed at said acute angle greater than 3 degrees to said line joining the crests of said first grooves, a second wall portion also disposed at an acute angle greater than 3 degrees to said line joining the crests of said first grooves, and a third, bottom wall portion joining said first and second wall portions and disposed generally perpendicular to the radius of said drum.

6. A helical scan video tape recording and/or reproducing apparatus according to claim 1 further comprising second grooves formed in said peripheral surface of said drum, the lengths of said second grooves being substantially normal to the lengths of said first grooves.

7. A helical scan video tape recording and/or reproducing apparatus comprising a guide drum having a peripheral surface for guiding a longitudinally transported video tape wrapped helically thereon, at least one rotary head projecting from said surface for recording signals on said tape and/or reproducing signals from said tape by obliquely scanning said tape on the guide drum, first grooves formed in said peripheral surface for preventing interference with smooth transport of said video tape due to buildup of moisture between said drum and said video tape, the lengths of said first grooves being substantially parallel to the direction of transport of said tape and each said first groove including a wall portion disposed at an acute angle greater than 3 degrees to a line joining the crests of said grooves and normal to said direction of transport of said tape, and second grooves formed in said peripheral surface of said drum, the lengths of said second grooves being substantially normal to the lengths of said first grooves, the width of said second grooves is in the range from 1 micron to 300 microns, the depth of said second grooves is more than 1 micron, and the pitch of said second grooves is in the range from 0.01 mm to 0.7 mm.

8. A helical scan video tape recording and/or reproducing apparatus according to claim 7 wherein the width of said second grooves is approximately 30 microns, the depth of said second grooves is approximately 15 microns, and the pitch of said second grooves is approximately 150 microns.

9. A helical scan video tape recording and/or reproducing apparatus according to claim 7 wherein each of second grooves includes side walls extending substantially radially relative to said drum.

10. A helical scan video tape recording and/or reproducing apparatus according to claim 1 wherein said drum comprises a stationary drum portion and a rotary drum portion carrying said head, said first grooves being formed in said stationary drum portion.

11. A helical scan video tape recording and/or reproducing apparatus according to claim 1 wherein said drum includes a stationary drum portion and a rotary drum portion carrying said head, said first grooves being formed in said rotary drum portion.

12. A helical scan video tape recording and/or reproducing apparatus according to claim 1 wherein said drum includes a stationary drum portion and a rotary drum portion carrying said head, said first grooves being formed in both said stationary and rotary drum portions.

* * * * *